US012700556B2

(12) United States Patent
Schertler et al.

(10) Patent No.: US 12,700,556 B2
(45) Date of Patent: Aug. 4, 2026

(54) ELECTROMECHANICAL RELAY AND MONITORING SWITCH FOR AN ELECTROMECHANICAL RELAY

(71) Applicant: TE Connectivity Solutions GmbH, Schaffhausen (CH)

(72) Inventors: Katrin Schertler, Berlin (DE); Thomas Haehnel, Berlin (DE); Matthias Kroeker, Berlin (DE)

(73) Assignee: TE CONNECTIVITY SOLUTIONS GMBH, Schaffhausen (CH)

(*) Notice: Subject to any disclaimer, the term of this patent is extended or adjusted under 35 U.S.C. 154(b) by 251 days.

(21) Appl. No.: 18/734,982

(22) Filed: Jun. 5, 2024

(65) Prior Publication Data

US 2024/0420906 A1 Dec. 19, 2024

(30) Foreign Application Priority Data

Jun. 13, 2023 (DE) ......................... 102023115318.8

(51) Int. Cl.
*H01H 47/00* (2006.01)
*H01H 50/54* (2006.01)

(52) U.S. Cl.
CPC ........ *H01H 47/002* (2013.01); *H01H 50/541* (2013.01)

(58) Field of Classification Search
CPC .... H01H 47/002; H01H 50/541; H01H 50/54; H01H 50/546; H01H 50/08; H01H 9/02; H01H 50/021; H01H 50/041
See application file for complete search history.

(56) References Cited

U.S. PATENT DOCUMENTS 2,951,133 A * 8/1960 Davies ................. H01H 51/065 335/196
10,790,105 B1 9/2020 Cho et al.

FOREIGN PATENT DOCUMENTS

CN 205004266 U 1/2016
CN 107204252 A 9/2017
(Continued)

OTHER PUBLICATIONS

Office Action for corresponding JPA pplication No. 2024094173 dated Jul. 11, 2025 (18 pages).
(Continued)

*Primary Examiner* — Mohamad A Musleh
(74) *Attorney, Agent, or Firm* — Jay J. Hoette; Carroll, Hoette & Butscher, LLC

(57) ABSTRACT

An electromechanical relay includes a relay housing enclosing a contact chamber of the relay and a contact arrangement arranged in the contact chamber. The contact arrangement has a movable armature and a coil for moving the armature, a shaft connected to the armature, and a contact bridge arranged on the shaft for contacting stationary relay contacts in the contact chamber. A monitoring switch with switch contacts for monitoring the switching state of the relay is arranged in the relay housing. The switch contacts can be actuated by an actuator displaced by the contact arrangement. The monitoring switch of the relay has a switch housing which is separate from the relay housing. Additional protection and improved sealing of the monitoring switch mechanism can be achieved as a result, which leads to a long-lasting and reliable function of the monitoring switch.

20 Claims, 3 Drawing Sheets

(56) References Cited

FOREIGN PATENT DOCUMENTS

| | | | | | |
|---|---|---|---|---|---|
| CN | 214254280 | U | | 9/2021 | |
| CN | 215933499 | U | | 3/2022 | |
| DE | 102021123868 | A1 | | 3/2023 | |
| JP | S39010462 | Y | | 4/1939 | |
| JP | 5986421 | B2 | * | 9/2016 | ............. H01H 50/54 |
| JP | 2017152264 | A | * | 8/2017 | ........... H01H 50/023 |
| JP | 2019133843 | A | | 8/2019 | |
| WO | 0075944 | A1 | | 12/2000 | |
| WO | WO-2013161206 | A1 | * | 10/2013 | ............. H01H 50/56 |
| WO | 2022168597 | A1 | | 8/2022 | |

OTHER PUBLICATIONS

Search Report for corresponding DE Application No. 102023115318.8 dated Mar. 20, 2024 (6 pages).

* cited by examiner

ELECTROMECHANICAL RELAY AND MONITORING SWITCH FOR AN ELECTROMECHANICAL RELAY

CROSS REFERENCE TO RELATED APPLICATIONS

This application claims the benefit of DE Application No. 102023115318.8, filed 13 Jun. 2023, the subject matter of which is herein incorporated by reference in its entirety.

BACKGROUND OF THE INVENTION

The subject matter relates to an electromechanical relay and a monitoring switch for such an electromechanical relay.

Electromechanical relays can be used, for example, as so-called HV relays in the high-voltage range and are used, for example, in the automotive sector, particularly in electromobility or for hybrid vehicles. Electromechanical relays can be used to control a current flow through a circuit by opening or closing a line path extending through the relay. In the high-voltage range in particular, it may be necessary to monitor the switching state of the relay, for example to ensure a safe state when initiating a charging process, to detect one-sided welding of the contact bridge to the relay contacts or to be able to display the switching state at an output means.

Efforts are increasingly being made in the direction of a microswitch that is integrated into the relay housing and that enables precise monitoring of the switching position by being positioned close to the contact arrangement.

Monitoring switches available in practice usually require installation space that is unsuitable for the existing relay. In addition, the available monitoring switches regularly have to be mounted on a circuit board, which requires additional installation space and also incurs additional costs.

Document CN 214254280 U discloses a relay with a microswitch that is arranged between the relay contacts and has an actuator opposite the shaft of the contact arrangement. When the shaft with the contact bridge is displaced in the direction of the relay contacts, the shaft presses the actuator of the microswitch in the direction of two parallel contact arms of the microswitch, so that contact is made between them and the switching state of the microswitch changes. The microswitch is embedded in the relay housing, with an opening being provided between the contact chamber with the contact arrangement and the microswitch chamber, the microswitch actuator being inserted into said opening.

There is a need for an electromechanical relay having a monitoring switch and also a monitoring switch suitable for such a relay, which enable long-term reliable monitoring of the switching positions of the relay.

BRIEF DESCRIPTION OF THE INVENTION

In one embodiment, an electromechanical relay includes a relay housing enclosing a contact chamber of the relay and a contact arrangement arranged in the contact chamber is proposed, wherein the contact arrangement has a movable armature and a coil for moving the armature, a shaft connected to the armature and a contact bridge arranged on the shaft for contacting stationary relay contacts in the contact chamber. A monitoring switch including switch contacts for monitoring the switching state of the relay is arranged in the relay housing. The switch contacts can be actuated by an actuator which can be displaced by means of the contact arrangement, wherein the monitoring switch has a switch housing which is separate from the relay housing.

In various embodiments, the electromechanical relay has the advantage that additional protection and improved sealing of the monitoring switch mechanism can be achieved, which leads to a long-lasting and reliable function of the monitoring switch. In other words, the monitoring switch is not exposed in the relay housing, but embedded in it in a defined protective covering. Despite the very small installation space available, it has proved to be worthwhile to provide a separate switch housing to protect the switching mechanism of the monitoring switch. The monitoring switch is protected by the switch housing in particular against the ingress of particles from the contact chamber of the relay, in which particle-detaching heat and friction effects can occur, for example due to the switching movements of the contact arrangement and the flowing switching currents. With the relay presented here, long-term, reliable monitoring of the switching positions of the relay within the housing is possible. The monitoring switch is designed to be robust thanks to the switch housing, but its internal switching mechanism can still be designed to be sensitive. In addition, the monitoring switch can be mounted more easily in the relay as a pre-assembled module with switch housing, which also makes it easier to manufacture the relay and simplifies maintenance or replacement of the monitoring switch.

In various embodiments, it may be advantageous if the relay housing and/or the switch housing has an actuator guide for the actuator of the monitoring switch. With the guide, the actuator can be guided to the actuation point in a targeted and defined manner. In addition, the actuator guide supports a reliable and precise displacement of the actuator on the switching mechanism of the monitoring switch by reducing the risk of the actuator tilting or slipping at the actuation point of the monitoring switch. In particular, the actuator can be displaced in a linear path of movement so that jamming of the actuator, on its path of movement, on a surrounding structure is avoided. The linear path of movement can be supported and ensured by a straight actuator guide. In particular, the periphery of the actuator can seal against a wall of the actuator guide in order to further reduce the possibility of particles entering the monitoring switch.

In various embodiments, the actuator guide can form a labyrinth at least in portions. A labyrinth, also known as a labyrinth seal in the context of electromechanical relays, can be formed by fine housing channels with at least one deflection, which can serve as a particle trap for suspended particles and fluid media. The sealing of the monitoring switch can be further improved with a labyrinth. Starting from the side of the contact arrangement, the actuator of the monitoring switch can be at least partially immersed in such a labyrinth, whereby an additional seal as well as a supplementary guide and, depending on the design, also a stop for the actuator can be provided. In addition, an actuator that is at least partially immersed in the labyrinth reduces the installation space required for the relay with monitoring switch.

In various embodiments, the actuator can advantageously extend between the contact bridge and the monitoring switch in a region of the relay housing facing the contact bridge. This allows the contact bridge movement to be monitored directly. The actuator can directly transmit the actuating movement of the contact arrangement to the monitoring switch. The monitoring switch can be arranged here in a region of the relay housing facing the contact bridge. The actuator can be connected to the contact bridge, for example by means of an integrally bonded or form-fitting connection.

According to an advantageous embodiment, the actuator is not connected to the contact bridge, in order to compensate for tolerances in the displacement movement and reduce the risk of jamming. The actuator can extend in an imaginary extension of the shaft in its actuating direction towards the relay contacts in the direction of the monitoring switch, so that the actuator can be displaced along a central force direction or force line of the contact arrangement, for example. This allows the actuator to be arranged in a way that is favorable in terms of force, so that the force transmission to the actuator is optimized and, for example, any torques acting on the actuator are avoided. The actuator can be automatically reset by means of an optional return spring in order to enable a sensitive and precise monitoring circuit with fast reaction times.

In various embodiments, the monitoring switch can be arranged between the relay contacts. This results in a particularly space-saving arrangement of the monitoring switch. In particular, no additional installation space needs to be provided in the relay for the monitoring switch. In addition, the switching position of the relay is monitored in the immediate vicinity of the relay contacts, enabling reliable and accurate monitoring.

According to a further embodiment, the actuator can extend between the armature or the shaft and the monitoring switch in a region of the relay housing facing away from the contact bridge. The monitoring switch can be arranged particularly advantageously in a region of the relay housing facing away from the contact bridge, for example below the armature if the contact bridge is located above the armature. This embodiment can be particularly suitable for relays that have a substantially closed switching chamber with the relay contacts and the contact bridge, which is spatially separated from the motor compartment, which comprises, for example, an arrangement with the coil, the armature, a core and/or a yoke. With the proposed embodiment, the probability of particles entering the monitoring switch can be further reduced, as the monitoring switch is positioned in a protected region of the contact arrangement that is remote from the contacts. The actuator can, for example, be arranged in the switch housing of the monitoring switch in a linearly displaceable manner and can cause the monitoring switch to be actuated by a tensile or compressive force applied by the displaced armature or shaft. The actuator can also be firmly connected to the armature or shaft, for example. The switch housing can have an actuator guide for the actuator. The actuator can be automatically reset by means of an optional return spring in order to enable a sensitive and precise monitoring circuit with fast reaction times.

The actuator can be made of a ceramic material, for example. The ceramic material can be zirconium oxide ceramic, for example, but other ceramic materials are also conceivable. This provides a particularly robust and temperature-resistant actuator with good sliding friction properties, high hardness and high mechanical strength. In particular, such an actuator has a high chemical stability, which is accompanied by a long service life without significant particle detachment. According to alternative embodiments, the actuator can also be made of a plastics material, for example a thermoset, for example if the actuator is actuated via the armature of the relay. Plastics-metal connections can also be advantageously used for the actuator. When selecting a suitable actuator material, any creepage distances specified by standardization must be observed.

In various embodiments, the monitoring switch has a contact arm and a mating contact arm as switch contacts, the contact arm being movable at least in portions towards the mating contact arm to make contact therewith. This embodiment enables the realization of very small, in particular narrow and flat monitoring switches. In addition, no separate lever is required to actuate the monitoring switch. The contact arm can be displaceable towards the mating contact arm by applying force to the actuator. The contact arm can be pivotable relative to the mating contact arm by means of the actuator. When contact is made between the contact arm and the mating contact arm in a designated contact region, an electrical contact is established between the contact arm and the mating contact arm and the monitoring switch assumes a switching state corresponding to the contacting. The contact arm and the mating contact arm are preferably arranged within the switch housing of the monitoring switch.

The contact arm can have a contact element projecting in the direction of the mating contact arm. The mating contact arm can have a mating contact element projecting in the direction of the contact arm. The contact element and/or the mating contact element can be designed as a contact rivet, for example. The contact element and/or the mating contact element can be connected to the contact arm or the mating contact arm mechanically or in an integrally bonded manner, e.g. by welding or brazing, or can be formed in one piece with the contact arm or the mating contact arm, for example by sputtering or by a spring material galvanized with precious metal and with an embossed contact nub. The contact arm and the mating contact arm can be spaced apart from each other by a spacer in a region facing away from the actuation region, in which the actuator acts on the contact arm, in order to ensure reliable contacting exclusively in the intended contact region of the contact arm and the mating contact arm.

The contact arm and/or the mating contact arm can advantageously be designed as a spring element. As a result, a gentle deflection and contacting can be achieved in accordance with a selected spring characteristic; in addition, the contact arm can be automatically reset by the actuator when the actuating force ceases. In particular, the spring elements can be designed as leaf springs and can thus form substantially flat contact elements of low height in order to realize a flat monitoring switch. The leaf surfaces of the contact arm and the mating contact arm can face each other and, for example, run parallel to each other at least in portions.

By forming the contact arm and/or the mating contact arm as a spring element, the monitoring switch is also particularly suitable for an arrangement in the direction of force of the contact arrangement, as a tolerance-related force overload on the switch contacts in the actuation region can be cushioned.

The contact arm and the mating contact arm can be arranged to be axially or laterally displaceable relative to each other. The relative displaceability can be achieved by a suitable geometry of the contact arm or mating contact arm, for example a resilient design with angles or bends, and a travelling mating contact. The relative displaceability allows limited friction in the contact region between the contact arm and the mating contact arm during contacting, which can achieve a favorable cleaning effect in the contact region. This effectively removes any particle deposits that may have formed on the contact surfaces or prevents them from forming in the first place.

In various embodiments, the contact arm can have a bend or angle. This allows, for example, an actuation region of the contact arm to be spatially offset from a contact region of the contact arm. As a result, contacting can already be realized with a short displacement path of the contact arm in the actuation region. The bend or angle can, for example, cause the contact arm to be deflected by an angle of between 10° and 90°. In particular, the contact arm can also have two or more bends or angles, wherein two successive bends or angles can be opposite each other. For example, the contact arm can be Z-shaped or can have one or more Z-shaped portions. The stiffness of the contact arm can also be reduced by means of bends or angles, whereby a slight relative movability of the contact arm in relation to the mating contact arm is realized. This can enable limited friction in the contact region between the contact arm and the mating contact arm, which can achieve an advantageous cleaning effect in the contact region. Any particle deposits that may have formed on the contact surfaces can thus be effectively removed or prevented from forming in the first place.

The contact arm can have an actuator receptacle. This enables a defined application of force by the actuator on the contact arm. The actuator receptacle can be arranged in an actuator region of the contact arm in which the actuator abuts the contact arm. In a simple embodiment, the actuator receptacle can be an indentation in the contact arm, into which the actuator can plunge. Advantageously, however, the actuator receptacle can also be a separate protective element to protect the contact arm from signs of wear. The actuator receptacle can, for example, be a dome-shaped protective element that is positioned on the contact arm, for example recessed into a through-opening of the contact arm. The actuator receptacle can be made of a robust plastics material, for example, and designed for frequent contact by the actuator. The shape of the actuator receptacle, for example a dome shape, and/or its material, for example a plastics material, can achieve additional sealing of the switching mechanism of the monitoring switch in the actuation region.

In various embodiments, the monitoring switch can have a contact follow path. This can compensate for increased pressure of the contact arm on the mating contact arm, for example by overpressing. For example, the contact follow path can be formed by a limitedly displaceable or elastically deflectable mating contact arm.

In various embodiments, the monitoring switch can be designed as a normally closed contact. In this case, the switching elements, for example the contact arm and the mating contact arm of the monitoring switch, are designed as so-called NC switching elements ("normally closed switches"). When actuated, the switching circuit is opened. A monitoring switch designed as an NC switch has a low tolerance sensitivity and can, for example, compensate for tolerances in the contact arrangement. It can also reduce the load on the contact arm.

In various embodiments, the monitoring switch can be designed as a normally open contact. In this case, the switching elements, for example the contact arm and the mating contact arm of the monitoring switch, are designed as so-called NO switching elements ("normally open switches"). When actuated, the switching circuit is closed.

In various embodiments, the switching elements of the monitoring switch can also be designed as changeover switches in order to be able to indicate a safely open state and a safely closed state.

The switch housing can be mounted and fixed in the relay housing using suitable integrated or additional connection means. For mounting, the switch housing can be inserted into a housing channel of the relay housing provided for this purpose. The switch housing can be screwed to the relay housing for secure fixing. According to an embodiment that simplifies assembly, the switch housing can have a latching element and can be configured to establish a latching connection with a mating latching contour of the relay housing. According to an advantageous embodiment, the switch housing can have a form-fit contour for contact with a corresponding mating contour of the relay housing. The form-fit contour can, for example, be a recess or an indentation on the outer contour of the switch housing, which can form an undercut with an associated mating contour of the relay housing. This can enable a form fit between the relay housing and the switch housing, which positions the switch housing particularly securely in the relay housing and protects it against unwanted displacement, which could lead to an impairment of the monitoring quality. The switch housing can, for example, be adapted to protrusions or recesses that already exist in the relay housing due to the design, so that installation space is optimized at the same time.

In an embodiment, a monitoring switch for an electromechanical relay is provided, wherein the monitoring switch is designed in accordance with one of the features described above. In various embodiments, the monitoring switch has a switch housing. In addition, the switch housing can, for example, have an actuator guide, which can, for example, also form a labyrinth at least in portions. The monitoring switch can have a contact arm arranged in the switch housing and a mating contact arm, the contact arm being movable at least in portions towards the mating contact arm to make contact therewith. The contact arm and/or the mating contact arm can be designed as a spring element. The contact arm and the mating contact arm can be arranged to be axially displaceable relative to each other. The contact arm can have a bend or angle. The contact arm can have an actuator receptacle. The switch housing can have a form-fit contour for contact with a corresponding mating contour of the relay housing.

The advantages of a safe, reliable and compact monitoring circuit for relays can also be achieved with the monitoring switch presented.

Quite generally, in the context of this application, the word "one", unless expressly defined otherwise, is not to be understood as a numeral, but as an indefinite article with the literal meaning of "at least one".

BRIEF DESCRIPTION OF THE DRAWINGS

The invention permits various embodiments and is explained in greater detail below with reference to exemplary embodiments with the accompanying drawings. The drawings show in schematic form.

DETAILED DESCRIPTION OF THE INVENTION

Figure 1:
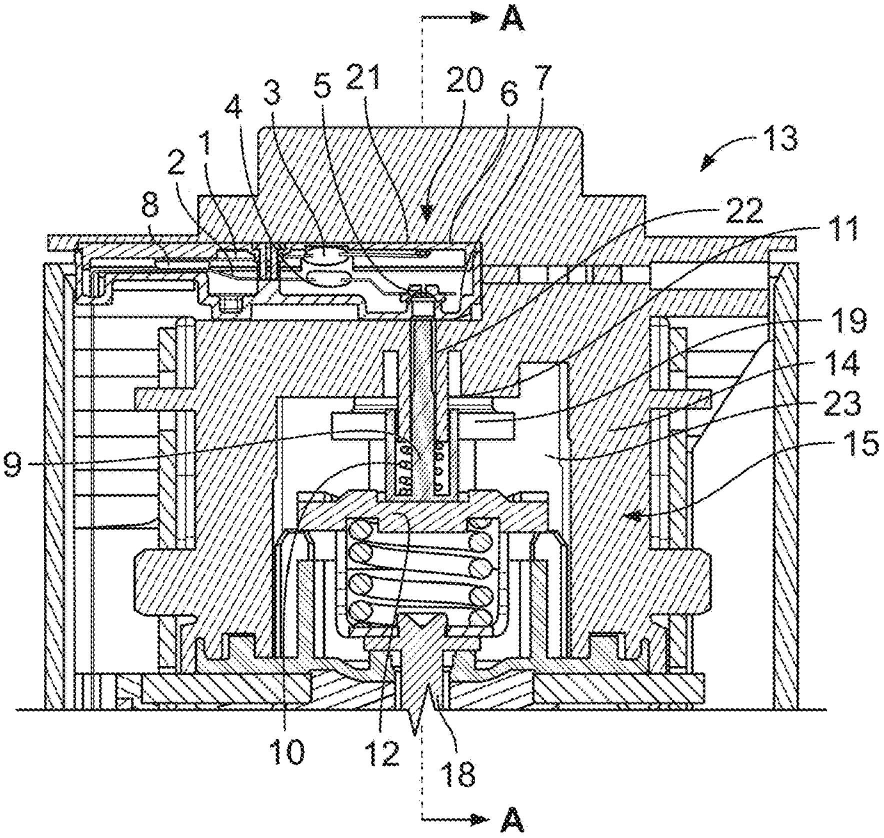
FIG. 1 shows a sectional side view of an electromechanical relay with a monitoring switch according to a first embodiment.
Figure 2:
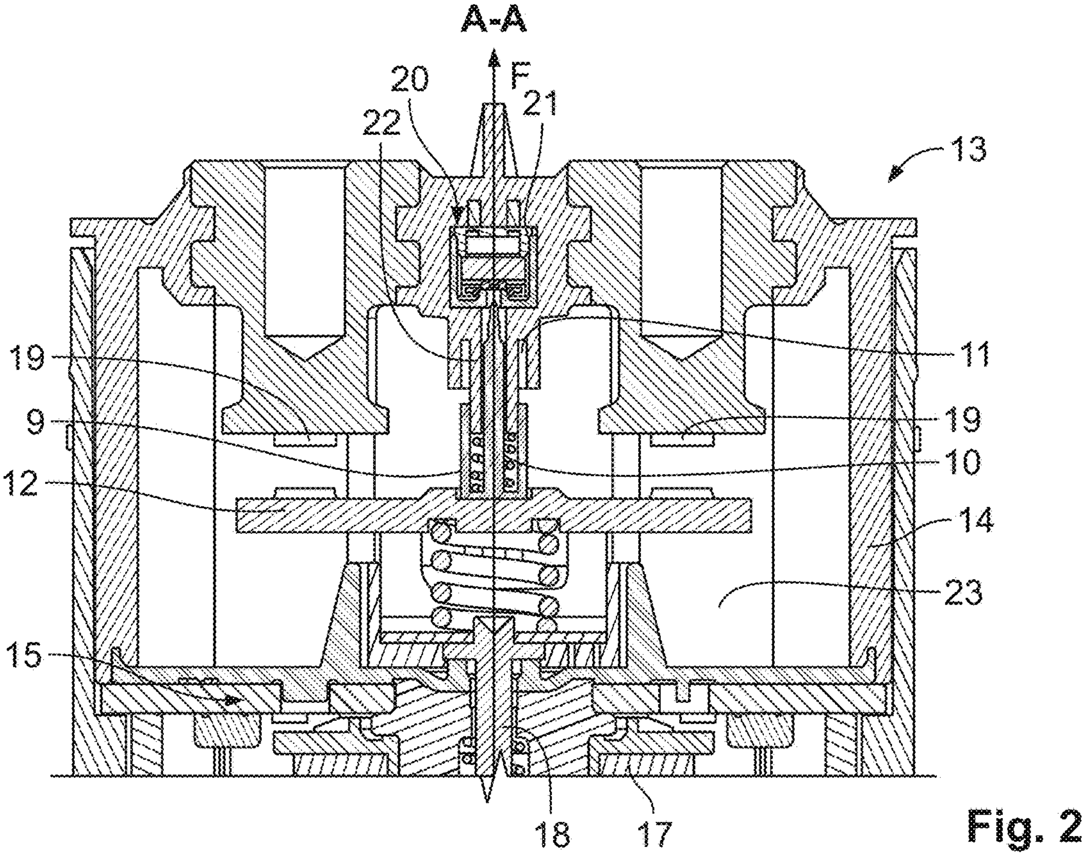
FIG. 2 shows a sectional front view of the electromechanical relay with a monitoring switch according to the first embodiment.

FIGS. 1 and 2 show sectional views of an electromechanical relay 13, in particular an HV relay, according to a first embodiment. The relay 13 shown has a relay housing 14 which encloses a contact chamber 23 in which a contact arrangement 15 is present. The contact arrangement 15 has a movable armature 16, which is not shown in further detail in the illustration but is comparable to the armature 16 in the second exemplary embodiment according to FIG. 3, and a coil 17 for moving the armature 16. For example, the armature 16 can be displaced linearly along a force direction F of the contact arrangement 15 by energizing the coil 17 in a suitable manner. A shaft 18 of the contact arrangement 15 is connected to the armature 16 and follows the armature movement, so that the shaft 18 can also be displaced linearly in the direction of force F of the contact arrangement 15. As a result, a contact bridge 12 connected to the shaft 18 can be displaced towards relay contacts 19 arranged in a fixed position in the contact chamber 23 in order to enable contacting between the contact bridge 12 and the relay contacts 19 and thus close an electrical conduction path. When the coil 17 is de-energized, the direction of movement of the contact arrangement 15 is reversed so that the armature 16, the shaft 18 and the contact bridge 12 are displaced back against the direction of force F of the contact arrangement 15 and contacting between the contact bridge 12 and the relay contacts 19 is cancelled so that the electrical conduction path is opened.

A monitoring switch 20 is arranged in the relay housing 14 in order to monitor the switching position of the relay 13, for example to be able to distinguish between contact and non-contact of the contact bridge 12 with the relay contacts 19. The monitoring switch 20 has switch contacts that are actuated by an actuator 9 connected to the contact arrangement 15 and change the switching state of the monitoring switch 20, for example between an open and closed state or an electrically conductive and a non-conductive state.

The monitoring switch 20 has a switch housing 21 that is separate from the relay housing 14, which protects the switch contacts inside the monitoring switch 20 and also largely seals them off from the contact chamber 23, for example. This provides a durable and robust monitoring switch 20 that can have a sensitive monitoring switch mechanism with low operating currents and voltages without being affected by interactions with interfering particles.

According to the exemplary embodiment shown, the relay housing 14 has an actuator guide 22 with a central guide channel for the actuator 9 and a labyrinth 11 adjacent to the guide channel, into which the actuator 9 can engage with a guide structure. The actuator guide 22 ensures defined guidance of the actuator 9 and, in particular in conjunction with the labyrinth 11, achieves a good seal between the monitoring switch 20 and the contact chamber 23. The actuator guide 22 can, for example, be a cylindrically shaped housing channel. It can be designed so that the actuator 9 is not completely pulled out of the actuator guide 22 in any switching position of the relay 13, so that the actuator 9 always reliably closes the actuator guide 22. The labyrinth 11 can form a stop for the guide structure of the actuator 9, since the actuator 9 can only enter it up to the maximum labyrinth depth and any further displacement of the actuator 9 is blocked by the labyrinth wall. The labyrinth 11 can also function as a particle trap by having fine housing channels with at least one deflection in which particles can become trapped.

Figure 5:
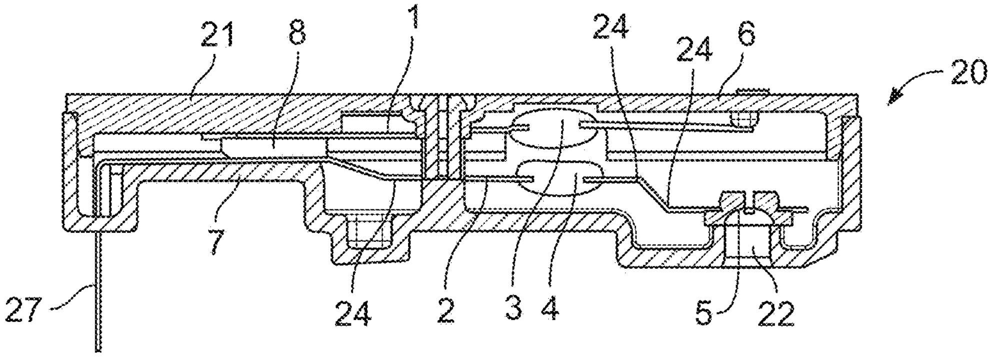
FIG. 5 shows a side sectional view of the monitoring switch.

As can be seen from the detailed illustration of the monitoring switch 20 shown in FIG. 5, for example, the switch housing 21 can also have an actuator guide 22, for example cylindrically shaped, for targeted actuation of the switch contacts in the monitoring switch 20.

According to the first exemplary embodiment shown in FIGS. 1 and 2, the actuator 9 extends in a region of the relay housing 14 facing the contact bridge 12 between the contact bridge 12 and the monitoring switch 20 in order to enable direct contact bridge monitoring. The monitoring switch 20 is arranged above the contact bridge 12 in a region of the relay housing 13 facing the fixed relay contacts 19 and, as shown in FIG. 2, projects into a space between the relay contacts 19, thus providing a very compact monitoring solution that can be easily integrated into the relay 13. The actuator 9 is connected to the contact bridge 12 and can be displaced with this along the direction of force F of the contact arrangement 15 in the direction of the monitoring switch 20 in order to actuate its switch contacts. A return spring 10 allows the actuator 9 to return automatically in order to realize a sensitive monitoring circuit with fast response times.

Figure 3:
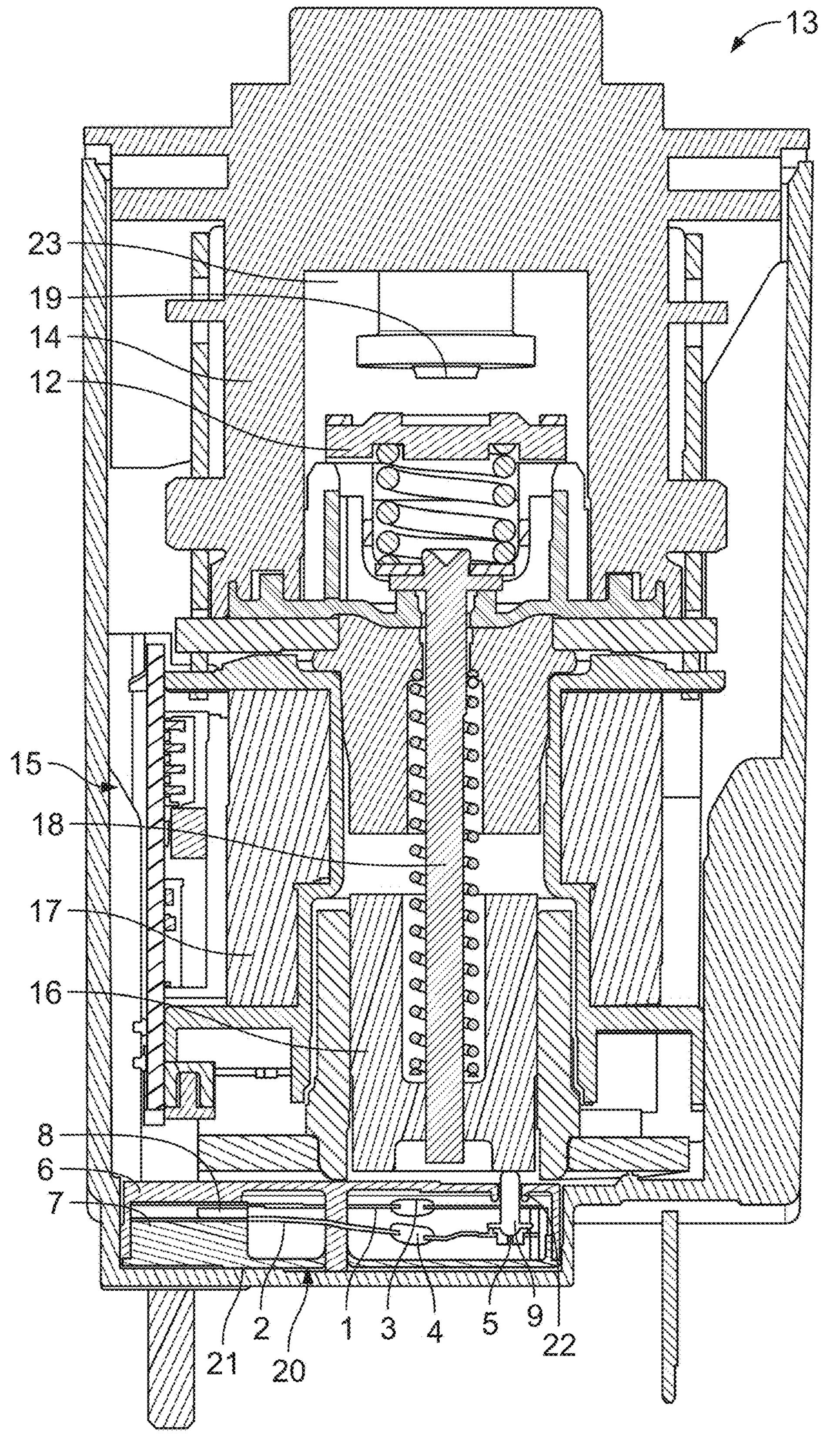
FIG. 3 shows a lateral sectional view of an electromechanical relay with a monitoring switch according to a second embodiment.

FIG. 3 shows an alternative possible arrangement of the monitoring switch 20 and thus illustrates a further exemplary embodiment. The contact arrangement 15 shown here has a comparable operating principle to the contact arrangement 15 of the first exemplary embodiment. According to the second embodiment, however, the monitoring switch 20 can also be arranged in a region of the relay housing 14 facing away from the contact bridge 12, in this case below the armature 16, the contact bridge 12 being located above the armature 16. The terms above and below or top and bottom can, for example, be related to the direction of force F of the contact arrangement 15, the direction of force F in the contacting position of contact bridge 12 and relay contacts 19 corresponding to an upward movement. In the second exemplary embodiment shown, the actuator 9 is displaced directly by the armature 16, which also enables very direct switching position monitoring with a favourable reference surface by the armature. In other exemplary embodiments, actuation of the actuator 9 by the shaft 18 is also conceivable in this arrangement. The switch housing 21 has an actuator guide 22, with which the actuator 9 can be guided in a defined manner towards the switch contacts of the monitoring switch 20.

Figure 4:
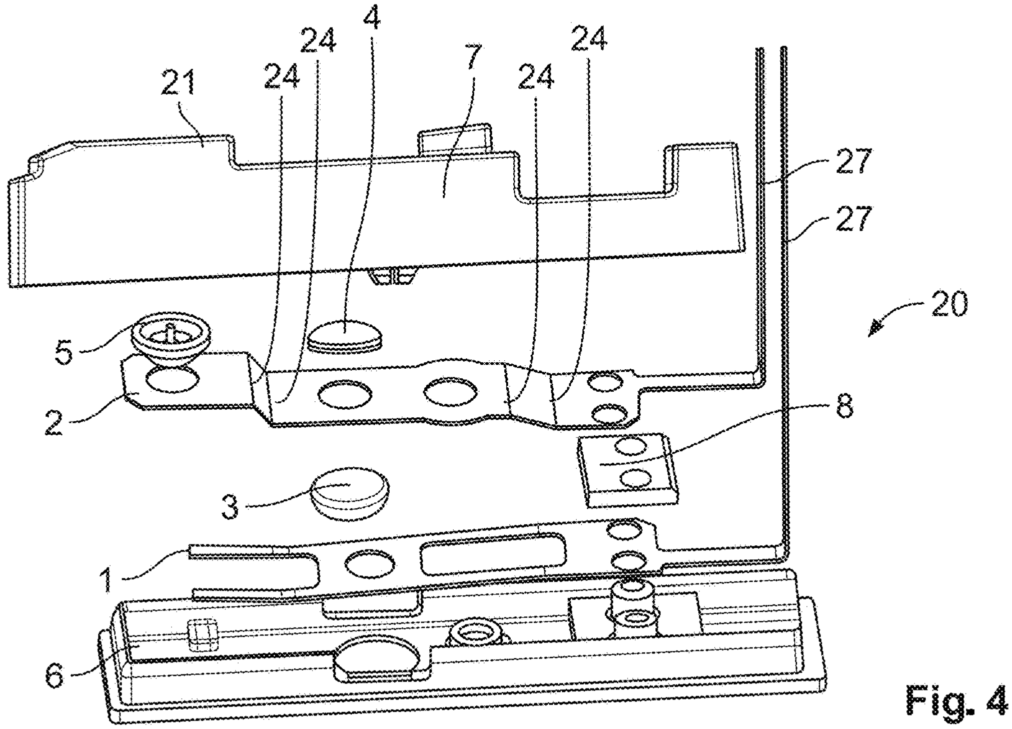
FIG. 4 shows an exploded view of the monitoring switch.
Figure 6:
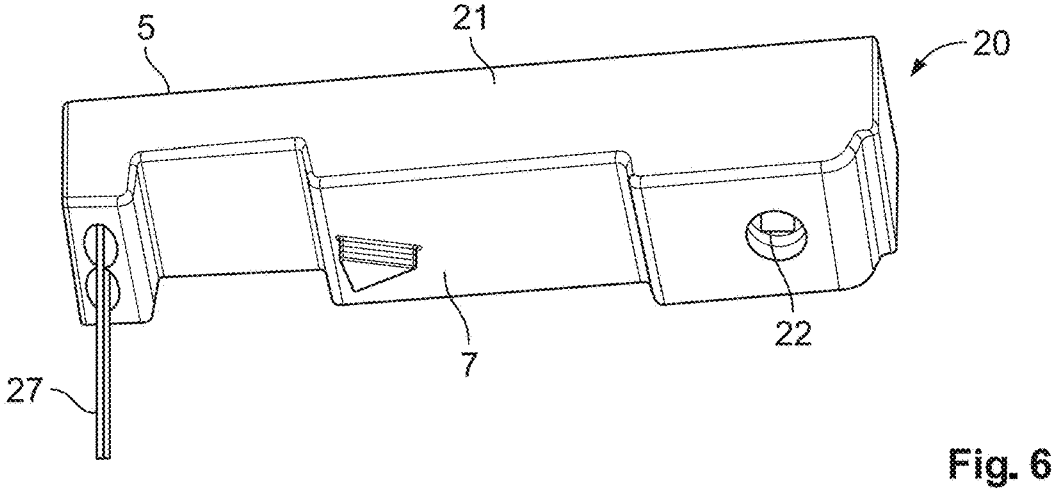
FIG. 6 shows a perspective bottom view of the monitoring switch.

The detailed structure of the monitoring switch 20 shown in the exemplary embodiments is explained below with reference to FIGS. 4 to 6. The monitoring switch 20 has a two-part switch housing 21 with a switch housing base 6 and a switch housing cover 7. The switch contacts of the monitoring switch 20 are arranged in the switch housing 21 and are formed as a contact arm 2 with a contact element 4 designed as a contact rivet and a mating contact arm 1 with a mating contact element 3 designed as a contact rivet. The contact arm 2 can be moved towards the mating contact arm 1, in particular pivoted towards it, in order to make contact with the mating contact arm 1 by means of the contact element 4 and the mating contact element 3. The contact arm 2 and the mating contact arm 1 are designed as leaf springs and enable a very narrow and flat design of the monitoring switch 20 with a gentle actuation option due to the possibility of resilient deflection of the contact arm 2.

The contact arm 2 can be moved towards the mating contact arm 1 by means of an actuator 9. For this purpose, the contact arm 2 has an actuator receptacle 5, which acts as a dome-shaped protective insert to protect the contact arm 2 from wear and particle ingress. In addition, the switch housing 21 has a cylindrical actuator guide 22 towards the actuator receptacle 5. Furthermore, a spacer 8 is provided between the contact arm 2 and the mating contact arm 1 in order to ensure reliable contact between the contact arm 2 and the mating contact arm 2 exclusively in the region of the contact elements 3, 4.

As shown in FIG. 1, the switch contacts of the monitoring switch 20 can be designed as NO switching elements, which only establish a closed circuit path in the sense of contacting when actuated by an actuator 9, so that the monitoring switch 20 is designed as a normally open contact. Other embodiments can also have an NC configuration of the switching elements, as shown in FIG. 3, for example, in which the normally closed circuit of the monitoring switch 20 is interrupted by actuation, so that the monitoring switch 20 is designed as a normally closed contact. By means of monitoring connections 27 connected to the switch contacts, the switching state of the monitoring switch 20 can be read out and further processed, for example displayed, via an evaluation circuit not shown in greater detail.

The contact arm 2 has several bends 24, through which the actuation region of the contact arm 2 is spatially offset from the contact elements 3, 4 and a Z-shape of the contact arm 2 is formed in portions. This slightly reduces the spring stiffness of the contact arm 2 and enables a limited axial relative movement between the contact elements 3, 4, through which a self-cleaning effect of the contact elements 3, 4 can be achieved by means of frictional forces.

With the presented relay 13 and the monitoring switch 20, a safe, reliable and compact monitoring circuit for the relay 13 can be achieved.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. Electromechanical relay comprising:

a relay housing enclosing a contact chamber of the relay;

a contact arrangement arranged in the contact chamber, the contact arrangement including a movable armature, the contact arrangement including a coil for moving the armature, the contact arrangement including a shaft connected to the armature, and the contact arrangement including a contact bridge arranged on the shaft for contacting stationary relay contacts in the contact chamber; and a monitoring switch including switch contacts for monitoring the switching state of the relay, the monitoring switch being arranged in the relay housing, the monitoring switch including an actuator coupled to the contact arrangement and configured to be displaced by the contact arrangement, wherein the switch contacts are actuated by the actuator, the monitoring switch including a switch housing holding the switch contacts and the actuator, the switch housing being separate from the relay housing.

2. Electromechanical relay according to claim 1, wherein the relay housing and/or the switch housing has an actuator guide for the actuator of the monitoring switch.

3. Electromechanical relay according to claim 2, wherein the actuator guide forms a labyrinth at least in portions.

4. Electromechanical relay according to claim 1, wherein the actuator extends between the contact bridge and the monitoring switch in a region of the relay housing facing the contact bridge.

5. Electromechanical relay according to claim 1, wherein the monitoring switch is arranged between the relay contacts.

6. Electromechanical relay according to claim 1, wherein the actuator extends between the armature or the shaft and the monitoring switch in a region of the relay housing facing away from the contact bridge.

7. Electromechanical relay according to claim 1, wherein the actuator is produced from a ceramic material.

8. Electromechanical relay according to claim 1, wherein the monitoring switch has a contact arm and a mating contact arm as switch contacts, the contact arm being movable at least in portions towards the mating contact arm to make contact therewith.

9. Electromechanical relay according to claim 8, wherein the contact arm and/or the mating contact arm is designed as a spring element.

10. Electromechanical relay according to claim 8, wherein the contact arm and the mating contact arm are arranged to be axially and/or laterally displaceable relative to each other.

11. Electromechanical relay according to claim 8, wherein the contact arm has a bend or angle.

12. Electromechanical relay according to claim 8, wherein the contact arm has an actuator receptacle.

13. Electromechanical relay comprising:

a relay housing enclosing a contact chamber of the relay;

a contact arrangement arranged in the contact chamber, the contact arrangement including a movable armature, the contact arrangement including a coil for moving the armature, the contact arrangement including a shaft connected to the armature, and the contact arrangement including a contact bridge arranged on the shaft for contacting stationary relay contacts in the contact chamber; and a monitoring switch including a contact arm and a mating contact arm forming switch contacts, the contact arm being movable at least in portions towards the mating contact arm to make contact therewith, the switch contacts for monitoring the switching state of the relay, the monitoring switch being arranged in the relay housing, the monitoring switch including an actuator coupled to the contact arrangement and configured to be displaced by the contact arrangement, wherein the switch contacts are actuated by the actuator, the monitoring switch including a switch housing holding the switch contacts and the actuator, the switch housing being separate from the relay housing.

14. Electromechanical relay according to claim 13, wherein the contact arm and/or the mating contact arm is designed as a spring element.

15. Electromechanical relay according to claim 13, wherein the contact arm and the mating contact arm are arranged to be axially and/or laterally displaceable relative to each other.

16. Electromechanical relay according to claim 13, wherein the contact arm has a bend or angle.

17. Electromechanical relay according to claim 13, wherein the contact arm has an actuator receptacle.

18. Electromechanical relay according to claim 13, wherein the relay housing and/or the switch housing has an actuator guide for the actuator of the monitoring switch.

19. Electromechanical relay according to claim 13, wherein the actuator extends between the contact bridge and the monitoring switch in a region of the relay housing facing the contact bridge.

20. Monitoring switch for an electromechanical relay, the monitoring switch comprising:

a switch housing configured to be coupled to a relay housing of the electromechanical relay, the switch housing having a chamber;

switch contacts arranged in the chamber, the switch contacts configured for monitoring a switching state of the electromechanical relay;

an actuator arranged in the chamber, the actuator configured to be operably coupled to a contact arrangement of the electromechanical relay and configured to be displaced by the contact arrangement, the actuator operably coupled to the switch contacts to actuate the switch contacts for monitoring the switching state of the electromechanical relay.

* * * * *